Sept. 8, 1931.  H. S. PIERCE  1,822,821
FRICTION CHAIN BELT
Filed Aug. 23, 1927
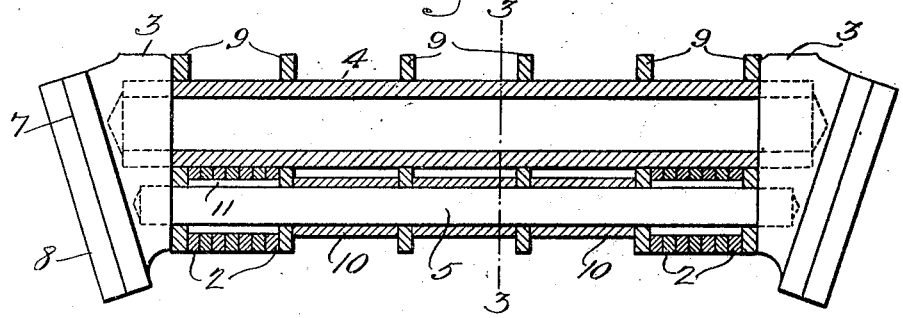
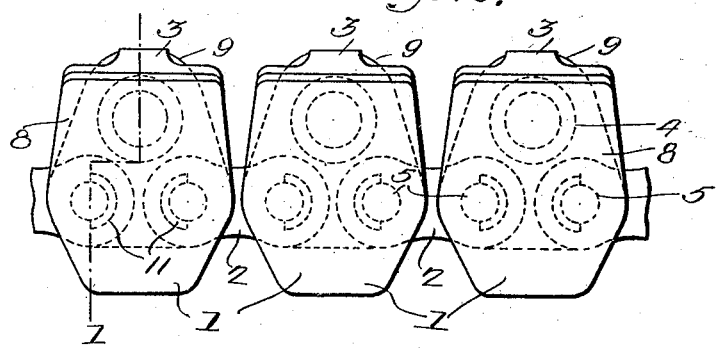
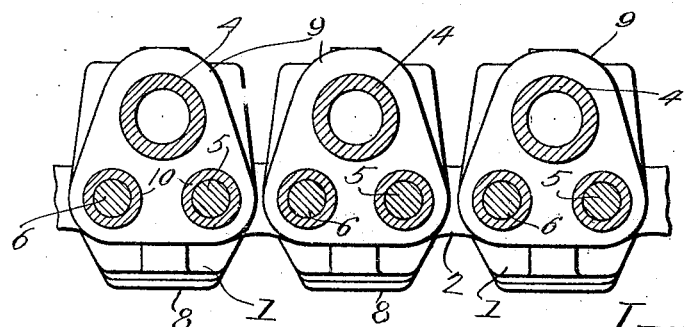
Inventor:-
Harold S. Pierce,
by his Attorneys,
Howson & Howson Patented Sept. 8, 1931

1,822,821

UNITED STATES PATENT OFFICE

HAROLD S. PIERCE, OF INDIANAPOLIS, INDIANA, ASSIGNOR TO LINK-BELT COMPANY, OF CHICAGO, ILLINOIS, A CORPORATION OF ILLINOIS

FRICTION CHAIN BELT

Application filed August 23, 1927. Serial No. 214,890.

This invention relates to improvements in friction drive chains of the V-type, and the principal object of the invention is to provide a chain of this type which shall be generally stronger and more durable than those obtained by the prior methods of construction.

More specifically, one of the objects of the invention is to provide a novel form of end block affording a relatively large bearing surface between the blocks and the intermediate spacing members entirely adequate to withstand the thrust which in operation is transferred from the end blocks to the spacing members.

Another object of the invention is to provide a novel form of cross or spacing member extending between the end blocks which shall have the advantage of relative lightness in weight and relatively high moment of inertia, thereby preventing deflection and localized wear.

A still further object of the invention is to provide means whereby the load on the chain is carried at points closely adjacent the end or grip blocks whereby the chain, pins and the cross members are relieved from high bending moments.

These and other useful ends I obtain by means of the structural details illustrated in the attached drawings, in which:

Figure 1 is a transverse section through a chain made in accordance with my invention taken on the line 1—1, Fig. 2;

Fig. 2 is a side view of the chain, and

Fig. 3 is a section on the line 3—3, Fig. 1.

Referring to the drawings, and as shown in Fig. 2, the chain comprises a plurality of transverse sections 1 united by links 2. As shown in Figs. 1 and 3, each of the transverse sections 1 comprises a pair of end or grip blocks 3 connected in the present instance by a relatively large tubular cross bar 4 and a pair of pins 5 and 6. In the present instance, the end blocks 3 are integral and solid and are so formed as to provide on their respective outer faces inclined gripping surface 7 to which in the present instance are secured friction pads 8. As illustrated, the tube 4, whose ends terminate and are suitably secured in sockets in the inner faces of the blocks 3 provided for their reception, extend between the upper and relatively heavy portions of the end blocks, while the pins 5 and 6 whose ends also are fitted into cavities in the end blocks occupy positions below the tubular bar and are symmetrically arranged with respect to the latter. The tube 4 and the pins 5 and 6 are united and reinforced by a series of plates 9, these plates having openings for passage of the tube and the said pins and being held in the desired spaced relation by means of sleeves 10 on the pins 5 and 6 and by means further of the links 2, which as shown in Fig. 1 are assembled in two groups at the extremities of the said pins and in each instance closely adjacent the end blocks 3.

As shown in Fig. 2, I preferably provide bushings 11 between the pins 5 and the links 2 which avoid undue wear in these relatively moving parts.

The above described construction has certain material advantages over chains of this general type as previously manufactured. By use of end blocks having sockets in which the spacing members terminate, the bearing surface between these parts is a relatively large one and is entirely adequate without strain to transfer the thrust from the said end blocks to the spacing members. As a result, the connection between the end blocks and the spacing members is an exceptionally strong one, contributing materially to the durability of the chain as a whole. By employing tubing in the major cross member 4, I provide a relatively light element having a high moment of inertia which is capable of taking the thrust from the end members without deflection, thereby avoiding localized wear. A further material advantage is obtained by the arrangement of the connecting links closely adjacent the grip blocks, since in this manner the load is so applied to the cross members that the latter are relieved from high bending moments.

I claim:

A friction drive chain comprising a plurality of interconnected transverse sections each consisting of a pair of rigid end blocks each having in its inner face a plurality of recesses, friction facing elements having inclined surfaces secured to the outer faces of said end blocks, a plurality of cross bars extending between the blocks with their extremities neatly fitting said recesses, and at least one reinforcing member rigidly uniting the cross bars intermediate the end blocks.

HAROLD S. PIERCE.